UNITED STATES PATENT OFFICE.

DANIEL MARTIN LAMB, OF BOSTON, MASSACHUSETTS.

COMPOUND FOR ELECTRIC BATTERIES AND METHOD OF PREPARING THE SAME.

SPECIFICATION forming part of Letters Patent No. 461,026, dated October 13, 1891.

Application filed May 26, 1891. Serial No. 394,155. (No specimens.)

*To all whom it may concern:*

Be it known that I, DANIEL MARTIN LAMB, a citizen of the United States, residing at Boston, in the county of Suffolk and State of Massachusetts, have invented certain new and useful Improvements in Compounds or Ingredients Constituting the Active Material of Electric Batteries and in Methods of Preparing Them, of which the following is a specification.

My invention more especially relates to a novel method of compounding and preparing active material for electric batteries and of combining it with electrodes of novel construction or organization.

Battery active material composed of constituents analogous to some of those herein mentioned is described and claimed in pending applications for United States Letters Patent heretofore filed by me December 7, 1889, Serial No. 332,992, and April 10, 1890, Serial No. 347,386, the ingredients being pulverized, mixed, heated, and formed into granules, each coated with a water-repellent substance.

My present invention consists in certain improvements, hereinafter set forth, in the compositions described in the applications above mentioned and their mode of preparation.

In order to carry out my invention I combine pulverized active materials, such as bichromate of soda, bichromate of potash, sulphate of copper, sal-ammoniac, or equivalent ingredients—one or more—with pulverized black oxide of manganese and rosin or equivalent water-repellent material. This mixture is heated sufficiently to melt the rosin, and thoroughly stirred, with the result of causing its particles to boil or swell and roll over each other in such manner that each particle becomes thoroughly coated with water-repellent material. Fine shot and melted paraffine are then added to the mixture, which is again stirred, with the result of forming an agglomeration of material coated with the paraffine around the shot.

While the proportions of my improved compounds may be varied within certain limits without departing from the spirit of my invention, and well-known chemical ingredients may be substituted therefor, I prefer, as the result of many experiments and practical demonstrations, a composition of the following ingredients, in about the proportions specified, treated in the manner hereinafter described viz.: bichromate of soda or potash, say, sixteen ounces; sulphate of copper, twenty-four ounces; sal-ammoniac, twenty-four ounces; black oxide of manganese, thirty-two ounces; carbon-dust, eight ounces; rosin, twenty-four ounces; ozocerite or paraffine, twenty-four ounces; small lead shot, eight ounces.

All the above materials save the paraffine and shot are finely pulverized, mixed, heated sufficiently to melt the rosin, and stirred, causing it to envelop each granule of the mass, as above stated. The melted paraffine or wax is then poured in and stirred until the granules are thoroughly coated with it. The small shot are then mixed with, say, thirty-two ounces of granulated black oxide of manganese, and the two stirred in with the coated granules, the resulting compound being granulated active material, including manganese, coated with water-repellent material, mingled with granulated manganese and shot not so coated.

I find the best result to be obtained by reducing the granules of active material to uniform size by passing them through a riddle or screen, say, of three-sixteenths of an inch mesh, and by reheating and repassing these granules through such screen three times.

This mixture I prefer to use immersed in water as the exciting fluid and in connection with carbon and zinc electrodes covered with absorbent fibrous material, such as flannel, canton-flannel, or strong heavy filtering-paper, as set forth in another application filed by me simultaneously herewith, Serial No. 394,156; but my improved compound may advantageously be used in connection with other exciting-fluids and other constructions of electrodes.

What I claim herein as new and as of my own invention is—

1. The method hereinbefore described of preparing active material for electric batteries, which consists in coating each separate granule with water-repellent material and then mixing such coated material with other ingredients not so coated.

2. The method hereinbefore described of preparing active material for electric batteries, which consists in coating each separate granule with water-repellent material and then mixing said coated material with granulated black oxide of manganese and small lead shot, as set forth.

3. Active material for an electric battery, consisting of a mixture of granules separately coated with water-repellent material and granules of black oxide of manganese not so coated.

4. The hereinbefore-described composition for active material of electric batteries, consisting of black oxide of manganese, sal-ammoniac, sulphate of copper, and a bichromate, such as soda or potash, pulverized and mixed in the form of granules and coated with water-repellent material.

In testimony whereof I have hereunto subscribed my name.

DANIEL MARTIN LAMB.

Witnesses:
WM. D. BALDWIN,
LLOYD B. WIGHT.